G. SCHREYER.

Mode of Making the Skeins of Axle Arms for Carriages.

No. 3,709. Reissued Nov. 2, 1869.

Witnesses:
A. McCallum.
J. W. Mister.

Inventor:
Gottlieb Schreyer.

N. PETERS, Photo-Lithographer, Washington, D. C.

United States Patent Office.

GOTTLIEB SCHREYER, OF COLUMBUS, OHIO.

*Letters Patent No.* 32,255, *dated May* 7, 1861; *reissue No.* 3,709, *dated November* 2, 1869.

IMPROVED MODE OF MAKING THE SKEINS OF AXLE-ARMS FOR CARRIAGES.

The Schedule referred to in these Letters Patent and making part of the same.

I, GOTTLIEB SCHREYER, of Columbus, in the county of Franklin, and State of Ohio, have invented certain Improvements in Metallic Skeins for the Axles of Carriages, of which the following is a specification.

*Nature and Objects of the Invention.*

This invention relates to metallic skeins for carriage-axles, formed from sheet-metal, in such manner that the material is so disposed as to meet the conditions of wear and strength, as hereinafter explained, and in such form, that when attached to the axle, its transverse strength is greatly increased; and It consists—

First, in forming such skeins with their outer and inner circumferences eccentric with each other, the metal being thickest on the bottom, to receive and withstand the wear which falls at that point.

Secondly, it consists in constructing such skeins with an extension, passing back beneath and bolted to the axle, giving great strength to the wood, where it would otherwise be weak, and by the same means providing a suitable and safe fastening for the skein outside, and independent of the wearing-parts.

My invention also consists in many features of minor importance in the manufacture of such skeins, as will be hereinafter explained in the technical description, and by the aid of the drawings.

*Description of the Accompanying Drawings.*

Similar letters of reference, on the different figures, indicate corresponding parts.

*General Description of the Skein, and the Mode of its Manufacture.*

Figure 1:
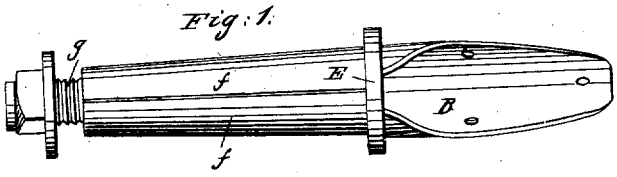
Figure 1 is a top view of an axle-skein, embodying my improvement.
Figure 2:
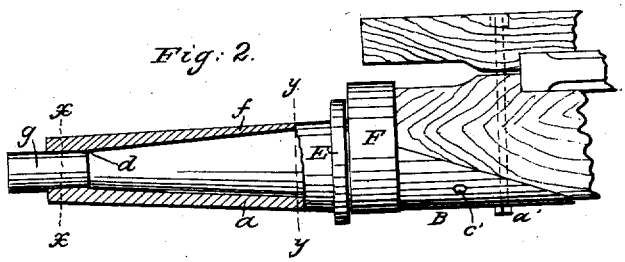
Figure 2 is a longitudinal section of the same, applied to a carriage-axle.
Figure 4:
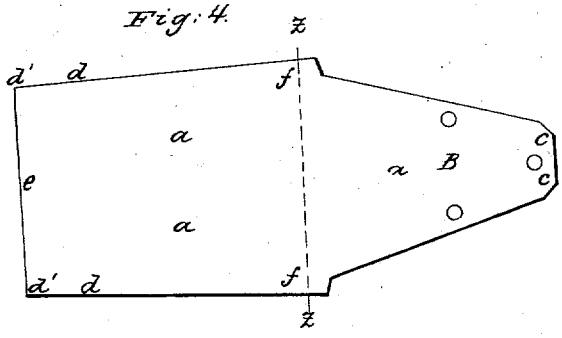
Figure 4 is a plane view of the plate, with its outline as formed before bent into the form of the skein.
Figure 3:
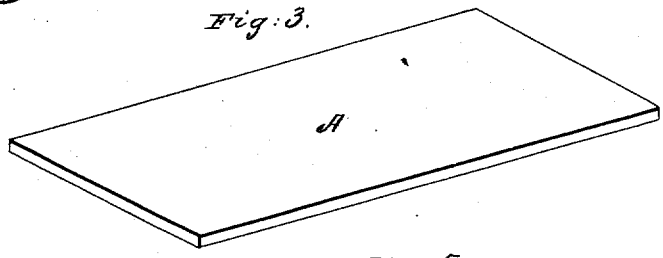
Figure 3 shows the blank or plate, from which the axle is formed.
Figure 6:
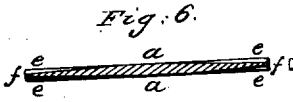
Figure 6 is an end view of the same.
Figure 5:
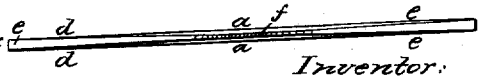
Figure 5 is an edge view of fig. 4.

The rectangular plate A, fig. 3, is, by forging, rolling, or other process, brought to the form shown in figs. 4, 5, and 6, the first process usually being to shear off the corners, so as to form the extension for fastening the skein to the axle, and for supporting the axle, as shown. The precise form of the piece shown in fig. 4 need not be followed; the angular corners hown may be avoided, and a plain triangular piece be cut off, the effect being merely to change the completed form of the extension-sheath B, that passes beyond the bearing, and supports the axle, as shown in figs. 1 and 2.

Figure 7:
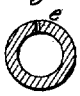
Figure 7 is a transverse section on the line *x x*, fig. 2.
Figure 8:
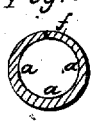
Figure 8 is a transverse section on the line *y–y* of fig. 2.

The plate is then reduced or drawn toward the edges, as shown in the section, fig. 6, and in such manner as to produce, when bent, the sections shown in figs. 7 and 8.

The plate thus formed is bent into a tapering cylindrical tube, by any of the well-known appliances used for such purpose, and presents the forms shown in figs. 1 and 2, 7 and 8, the bottom being as represented in figs. 2 and 8, much thicker than the top, to withstand the wear, which is very great on such skeins when heavy loads are hauled.

The top of the skein, at *f f*, fig. 8, as reduced, becomes, in a degree, flexible, and when the skein is driven on, clamps the wood firmly, and insures a perfect fit.

The skein thus prepared has a band, E, fitted on, to form a shoulder, as shown in figs. 1 and 2. The smaller end is provided with proper mechanical appliances to keep the wheel on. A plug may be welded in, having an extension, to receive a nut, as shown in fig. 1 of the drawings, or the skein may be an open cylinder, and threads formed on the periphery, as described in my Letters Patent, of May 4, 1869, for improved axle-skein, while in some cases the common linchpin is found preferable, it being well understood that any of the well-known devices for retaining loose wheels upon their spindles, either in carriages or in machinery may be employed for the purpose, without altering in any manner the nature of my invention.

When the smaller end of the skein is left open, and no plug used, as in figs. 1 and 2, they are usually welded for a short distance far enough to receive a screw-thread, for an external nut, or an internal screw-plug, or to receive the holes for a linchpin, although they may be made open through their entire length on the top side.

The extension that passes back beneath the axle, forms a strong support for the axle, at the shoulder of the tenon. The strength thus added by this form of skein is so great that the diameter of the whole can be greatly reduced. Without this extension, the fulcrum and breaking-point of strain falls at the shoulder-collar E, and has nothing to resist it but the tensile strength of the wood on the bottom side, while in the form here shown, the strength of the metal is added to the wood, also, the transverse strength of the skein, as will be readily understood by those skilled in such manufactures.

The skein is fastened on mainly by the bolt *a′*, shown in fig. 2, which passes through the supporting-extension of the skein, and may be employed to connect the framing, as shown in the same figure, but additional bolts, clips, or other fastenings may be used, when necessary.

Nails or screws may, for greater security, be applied, as shown at *c'*, fig. 2, but the main tenon need not, in any case, be perforated or cut away, thereby impairing its strength.

Steel, from its superior hardness and qualities for wear, is generally employed for the manufacture of these skeins; they may also be hardened to any degree, after they are formed. Wrought-iron may also be used, and the surface case-hardened, or otherwise, the form of the skein being such as to withstand these processes without injury.

*Claims.*

I claim, as my invention—

1. An axle-skein, with its under wearing-part *a a a*, and its end *c d d*, of a uniform thickness, as represented in the drawings, and its upper part *f f*, of a gradually-decreasing thickness, as hereinbefore set forth and illustrated in the drawings.

2. An axle skein, made of one plate, with its under part back of shoulder, to extend back far enough to give the wood axle any desired support, constructed as and for the purposes hereinbefore set forth.

Witnesses: GOTTLIEB SCHREYER.

T. C. CONNOLLY,

H. T. MUNSON.